United States Patent
Watanabe

(10) Patent No.: US 6,414,591 B1
(45) Date of Patent: Jul. 2, 2002

(54) APPARATUS ADAPTED FOR MOUNTING IN A VEHICLE

(75) Inventor: Kan Watanabe, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/711,099

(22) Filed: Nov. 14, 2000

(30) Foreign Application Priority Data

Nov. 30, 1999 (JP) .......................................... 11-338903

(51) Int. Cl.7 ................................................ B60Q 1/00
(52) U.S. Cl. ....................... 340/438; 180/286; 318/467; 340/425.5
(58) Field of Search ............................. 340/438, 6, 86, 340/425.5, 545; 49/31, 360, 139, 506; 219/679; 318/286, 293, 466, 467; 180/286

(56) References Cited

U.S. PATENT DOCUMENTS

| | | | |
|---|---|---|---|
| 3,744,022 A | * 7/1973 | Olsen | |
| 3,891,909 A | * 6/1975 | Newson | 318/469 |
| 4,546,845 A | * 10/1985 | Meyer et al. | 180/286 |
| 5,059,957 A | 10/1991 | Todoriki et al. | 340/705 |
| 5,134,350 A | * 7/1992 | Mahoney | 318/466 |
| 5,193,141 A | 3/1993 | Zwern | 395/2 |
| 5,524,859 A | 6/1996 | Squires et al. | 248/551 |
| 6,060,700 A | * 5/2000 | Perlman et al. | 219/679 |

FOREIGN PATENT DOCUMENTS

| | | | |
|---|---|---|---|
| CN | 1991 0111475 | * | 12/1991 |
| FR | 2 741 576 | | 5/1997 |
| JP | JP-62007275 | | 1/1987 |
| JP | 8-282391 | | 10/1996 |

* cited by examiner

Primary Examiner—Brent A. Swarthout
(74) Attorney, Agent, or Firm—Oliff & Berridge PLC

(57) ABSTRACT

An apparatus mounted in a vehicle having a door, a door detecting means, a driving detecting means, and a door control means. The door has an open position and a closed position. The door detecting means detects a condition of the door, and the driving detecting means detects a driving condition of the vehicle, that is whether the vehicle is running or stops. The control means controls the door to close and controls to announce that the door is closing, when the door is open and the vehicle is running. On the other hand, when the door is closed and the vehicle is running, the door is prevented from opening and "the door is prevented from opening" is announced. Since a clearance between the door and other parts caused by vibrations of the apparatus during running does not increase, a durability of the apparatus is high.

22 Claims, 3 Drawing Sheets

APPARATUS ADAPTED FOR MOUNTING IN A VEHICLE

INCORPORATION BY REFERENCE

The disclosure of Japanese Patent Application No. 11-338903 filed on Nov. 30, 1999 including the specification, drawings and abstract is incorporated herein by reference in its entirety.

FIELD OF THE INVENTION

The present invention relates to an apparatus which is mounted in a vehicle and comprises a door having an open position and a closed position.

BACKGROUND OF THE INVENTION

One example of an apparatus mounted in a vehicle and comprising a door having an open position and a closed position is shown in Japanese Laid-Open Patent Application No. 8-282391. In this case, the apparatus is a television further having an audio unit. An outside face of a panel holds the television display unit. When a door that includes the panel is closed, the display unit shows moving pictures by receiving airwaves. On the other hand, the apparatus is used as an audio unit by driving a CD player or a cassette player, after the door is open and a CD or a cassette is inserted into the audio unit.

However, a clearance between the door and other parts may increase, and an undesirable gap may appear between the door and other parts because of vibrations, when the door is open and the vehicle is running. That is, the door of the apparatus is vulnerable to driving of the vehicle.

SUMMARY OF THE INVENTION

It is thus one object of the present invention to solve the aforementioned problems. An object of the invention is to prevent a door contained in an apparatus with the door mounted in a vehicle from opening when the vehicle is running. Another object is to have a high durability of the apparatus.

An apparatus mounted in a vehicle comprises a door, a door detecting means, a driving detecting means, and a door control means. The door has an open position and a closed position. The door detecting means detects a condition of the door. The driving detecting means detects a driving condition of the vehicle. A door control means controls the door in response to the condition of the door when the driving detecting means detects that the vehicle is running.

Since the door control means controls the door of the apparatus in response to the condition of the door when the driving detecting means detects that the vehicle is running, the apparatus can keep the door under a condition appropriate to the driving condition of the vehicle.

It is also available that the apparatus further comprises a door driving means for moving the door from the open position to the closed position and the door control means controls the door driving means to close the door when the door is open and the vehicle is running.

Since the door in the apparatus is closed when the door is open and the vehicle is running, an increase in the clearance between the door and other parts caused by vibrations of the apparatus during driving can be avoided and a durability of the apparatus is high.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

Figure 1:
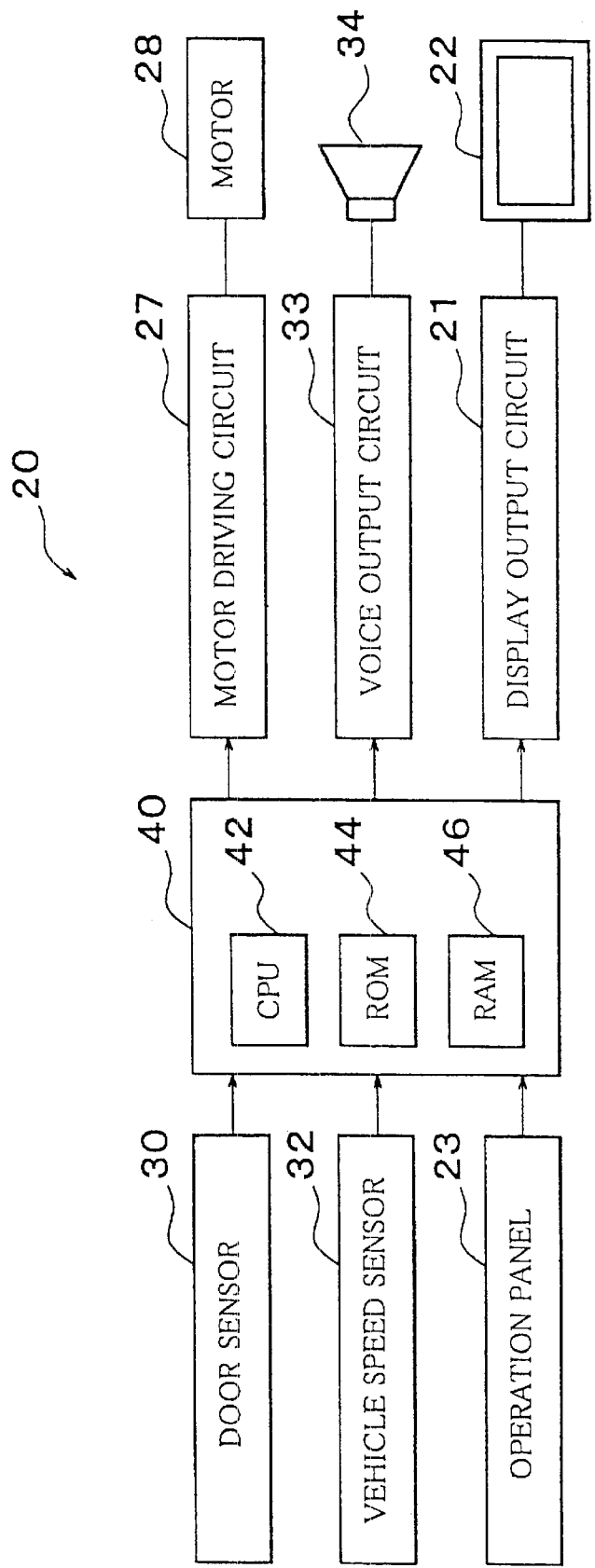
FIG. 1 is a block diagram showing an electric structure for controlling an apparatus 20 with a door 24 as one example in an embodiment of the present invention.
Figure 2:
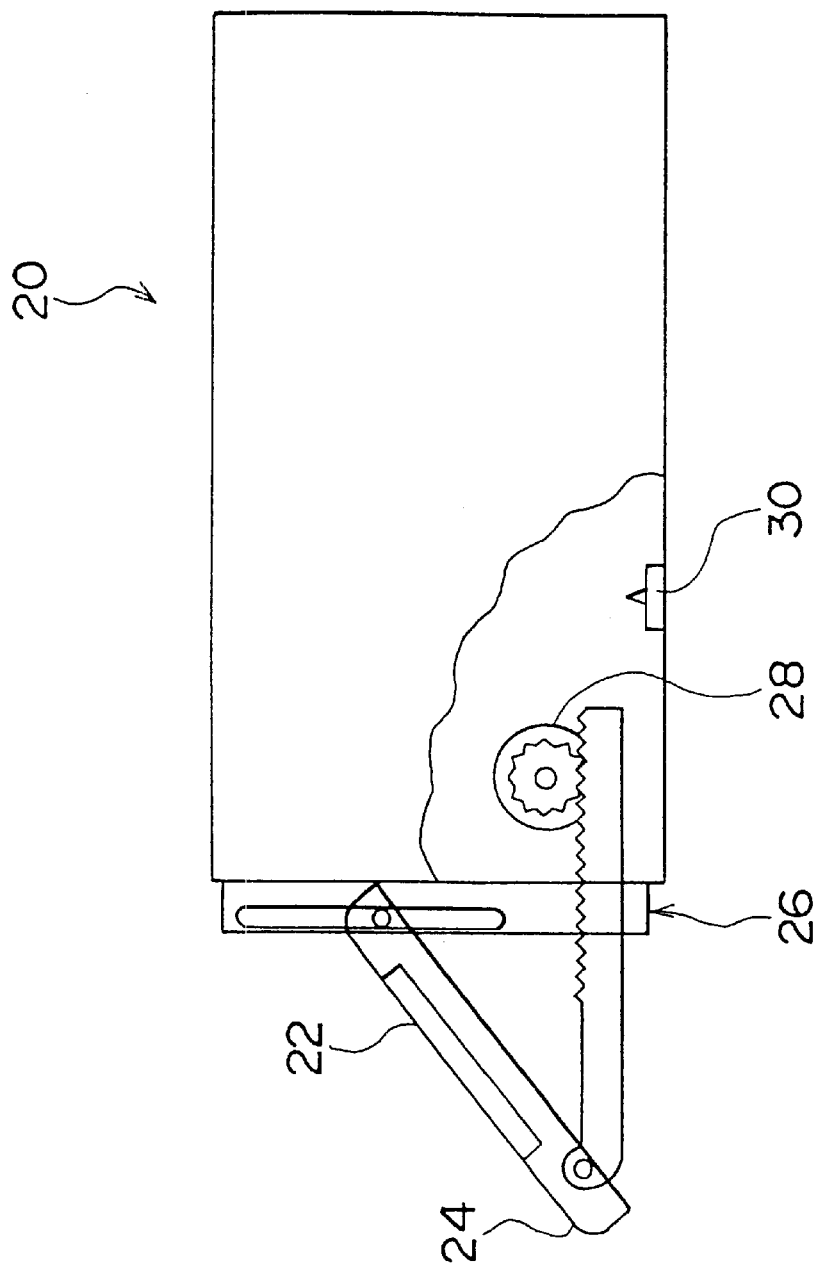
FIG. 2 is a schematic illustration of the apparatus 20 as an embodiment of the present invention.

In the following description and the accompanying drawings, the present invention will be described in more detail in terms of specific embodiments. FIG. 1 is a block diagram which shows an electric structure for controlling an apparatus 20. The apparatus 20 is one example of an embodiment of the present invention. FIG. 2 is a schematic view which shows a mechanical structure of the apparatus 20. In this case the apparatus 20 is an playback apparatus having a CD player, a cassette player, or DVD player. As shown in FIG. 2, the apparatus 20 has a door 24, a door mechanism 26, a motor 28, a door sensor 30, etc. The door 24 includes an operation panel 23 in a front side, and the operation panel 23 is for operating a liquid crystal display (LCD) 22, a CD player, a cassette player, etc. The door mechanism 26 drives the door 24 to open or close. The motor 28 functions as an actuator for the door mechanism 26. The door sensor 30 detects a condition of the door 24; that is, whether the door 24 is open or closed. A CD or a cassette is inserted into the apparatus 20, when the door 24 is open.

As shown FIG. 1, the apparatus 20 with the door 24 has an electric control unit (ECU) 40 which controls the apparatus 20. The ECU 40 is made up as a microprocessor mainly comprising a CPU 42. To be concrete, the ECU 40 comprises the CPU 42, a ROM 44, a RAM 46, an input port (not shown in FIG. 1), an output port (not shown in FIG. 1), etc. The ECU 40 receives a signal of a door condition from the door sensor 30, a signal of a vehicle speed from a vehicle speed sensor 32, several switch signals from the operation panel 23, etc. by way of the input port. The ECU 40 outputs a signal to a motor drive circuit 27 for driving the motor 28, a signal to a voice output circuit 33 for outputting a voice of a speaker 34, a signal to a display output circuit 21 for displaying on the LCD 22, etc. by way of the output port.

Figure 3:
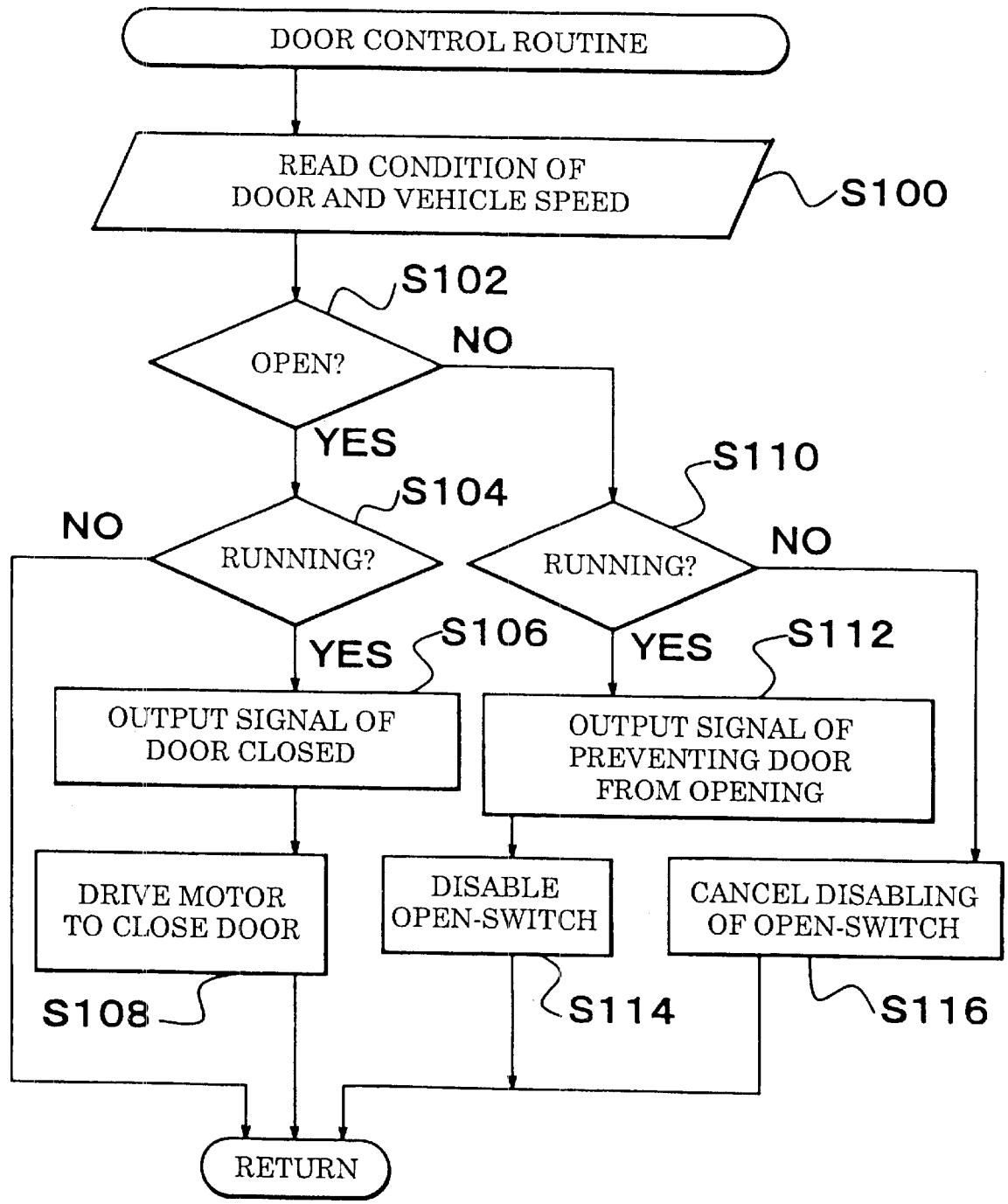
FIG. 3 is one example of a flowchart showing a door control routine executed in an electric control unit (ECU) 40 in the apparatus 20.

Next, an action of the apparatus 20, especially an action of the door 24, is explained. FIG. 3 is a flowchart showing one example of a door control routine which is executed by the ECU 40 of the apparatus 20. This routine is repeatedly executed from turn-on until turn-off of an electric switch of the vehicle, once per a predetermined period (for example, once per one second).

After the door control routine starts, the CPU 42 of the ECU 40 executes a treatment of reading a condition of the door 24 detected by the door sensor 30 and a vehicle speed detected by the vehicle speed sensor 32 in step S100 (hereinafter only S100 is expressed, other steps are expressed in the same way). At S102 whether the condition of the door 24 is open or not is determined. When "yes" is determined at S102, whether the vehicle is running or not is determined at S104. When "no" is determined, whether the vehicle is running or not is also determined at S110.

When "yes" is determined at S104, that is the door 24 is open and the vehicle is running, the routine proceeds to S106. A signal to shut the door 24 is sent to the motor drive circuit 27 in S106, and the motor drive circuit 27 controls the motor 28 to close the door 24 in S108. This routine, then, proceeds to RETURN. Incidentally, the outputting of a signal of closing the door 24 is, for example, executed by outputting a voice that "the door is closing" from the speaker 34, or by outputting a signal of displaying the above-mentioned sentences ("the door is closing") on the LCD 22 to the display output circuit 21. By announcing that the door 24 is closing, it can be avoided that a driver or passengers feel uneasiness when the door 24 is automatically closed. Furthermore, since the door 24 is automatically closed, it can be avoided that a clearance between the door 24 and other parts increases because of vibrations of the apparatus 20 during running of the vehicle. On the other hand, when "no" is determined at S104, that is the door 24 is open and the vehicle stops, the routine jumps to RETURN.

When "yes" is determined at S110, that is the door 24 is closed and the vehicle is running, a signal of preventing the door 24 from opening is outputted in S112. Next, the routine proceeds to S114. In S114, an open-switch which controls the door 24 is masked. That is, operation or switching of the open-switch is disabled. Then, the routine goes to RETURN. Here, the door 24 is prevented from opening, for example, by outputting a signal to the voice output circuit 33 so that the speaker 34 announces that "opening the door is prohibited", or by outputting a signal to the display output circuit 21 so that the LCD 22 displays the same sentence ("opening the door is prohibited") as the above-mentioned announcement. By announcing of preventing the door 24 from opening, the driver or passengers are prevented from trying to open the door 24 during driving. Moreover, even if the driver or passengers try to operate the open-switch for opening the door 24 on the operation panel 23, the operation is treated as ineffective. Since the door 24 does not open during running of the vehicle, it can be avoided that a clearance between the door 24 and other parts increases because of vibrations of the vehicle. Consequently, a durability of the apparatus 20 is high.

When "no" is determined at S110, that is the door 24 is closed and the vehicle stops, the masking of the open-switch is cancelled in S116. That is, the disabling of the open-switch is cancelled. Then, the routine proceeds to RETURN. This indicates that the door 24 is allowed to open or close when the vehicle stops.

As mentioned above, since during running of the vehicle the door 24 is automatically closed when the door 24 is open, and the door 24 is prevented from opening when the door 24 is closed, it avoided that a clearance between the door 24 and other parts increases because of vibrations of the apparatus 20. Furthermore, because the driver or passengers can be notified by the announcement by the voice or the display by the LCD 22, the driver or passengers do not feel uneasiness during the automatic closing of the door 24 or the automatic prevention of the door 24 from opening.

In the above-mentioned embodiment, the door 24 closing is announced, and the door 24 is automatically closed when the door 24 is open and the vehicle is running. On the other hand, it is also available that the door 24 is automatically closed without announcing that the door 24 is closing. Furthermore, it is also available that a condition of the door 24 is only announced without automatic closing of the door 24.

In the above-mentioned embodiment, the door 24 is prevented from opening when the door 24 is closed and the vehicle is running. It is also available that the door 24 is prevented from opening without announcing that the door 24 is prevented from opening. Moreover, it is also available that prevention of the door 24 from opening is only announced, such as for example "Please don't open the door during running" without preventing the door 24 from opening.

It is also available that prevention of the door 24 from opening is announced only when the operator (the driver or passenger) tries to operate to open the door 24. Furthermore, it is also available that the door 24 is once allowed to open during running of the vehicle and the CD or cassette tape can be changed, and that the door 24 is automatically closed or "the door is closing" is announced in the case that the door 24 is kept open after a predetermined time.

In the above-mentioned embodiment of the apparatus 20, just after electric power of the vehicle begins to be on, the door control routine starts. However, it is also available that the routine shown in FIG. 3 starts after a predetermined time passes after the vehicle begins to run. By this way, the door 24 can be automatically closed or prevented from opening after the predetermined time after the vehicle begins to run.

Incidentally, the door 24 can be used as a tilt condition (at a predetermined slant angle) for improving an operation or visual performance, especially for a display or an operation panel of a playback apparatus for a CD for music or a DVD for map. In such a tilt condition, the door 24 is held stably, and rattling or vibrations of the door 24 are restricted. Consequently, the tilt condition of the door 24 is taken as that the door 24 is closed, and the tilt condition can be kept as it is during running of the vehicle. It is also available that an inserting port for a CD or a cassette tape in a tilt condition of a door is exposed outside and an inserting port for a DVD for a navigation is not exposed outside. In this case, the CD or the cassette tape can be changed, but the DVD can not be changed during running of the vehicle.

In the aforementioned embodiment of the apparatus, the apparatus 20 has the CD player, the cassette player, or the DVD player. However, any type of apparatus is also available, if the apparatus has a door which can be opened and closed.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus adapted for mounting in a vehicle, the apparatus comprising:

a door having an open position and a closed position;

a door detecting means for detecting a condition of the door;

a driving detecting means for detecting a driving condition of the vehicle; and a door control means for controlling the door in response to the condition of the door when the driving detecting means detects that the vehicle is running, wherein the door control means controls the door when a predetermined time elapses after the driving detecting means detects that the vehicle is running.

2. The apparatus as set forth in claim 1, further comprising a door driving means for moving the door from the open position to the closed position, wherein the door control means controls the door driving means.

3. The apparatus as set forth in claim 1, further comprising a door driving means for moving the door from the open position to the closed position, wherein the door control means controls the door driving means.

4. The apparatus as set forth in claim 1, further comprising a door driving means for moving the door, wherein the door control means controls the door driving means so that the door is prevented from opening when the door is closed.

5. The apparatus as set forth in claim 1, further comprising a door driving means for moving the door, wherein the door control means controls the door driving means so that the door is prevented from opening when the door is closed.

6. The apparatus as set forth in claim 2, wherein the door control means controls the door driving means so that the door is prevented from opening when the door is closed.

7. The apparatus as set forth in claim 3, wherein the door control means controls the door driving means so that the door is prevented from opening when the door is closed.

8. The apparatus as set forth in claim 2, wherein the door control means comprises an announcing means for announcing the closing of the door when the door is open.

9. The apparatus as set forth in claim 3, wherein the door control means comprises an announcing means for announcing the closing of the door when the door is open.

10. The apparatus as set forth in claim 1, further comprising a door driving means for moving the door, the door control means further comprising an announcing means for announcing the closing of the door when the door is open, wherein the door control means controls the announcing means to announce that the door is closing when the door is open while the door control means does not control the door driving means to close the door.

11. The apparatus as set forth in claim 1, further comprising a door driving means for moving the door, the door control means further comprising an announcing means for announcing the closing of the door when the door is open, wherein the door control means controls the announcing means to announce that the door is closing when the door is open while the door control means does not control the door driving means to close the door.

12. The apparatus as set forth in claim 4, wherein the door control means comprises an announcing means for announcing that the door is prevented from opening when the door is closed.

13. The apparatus as set forth in claim 5, wherein the door control means comprises an announcing means for announcing that the door is prevented from opening when the door is closed.

14. The apparatus as set forth in claim 1, further comprising a door driving means for moving the door, the door control means further comprising an announcing means for announcing that the door is prevented from opening when the door is closed, wherein the door control means controls the announcing means to announce that the door is prevented from opening when the door is closed while the door control means does not control the door driving means to prevent the door from opening.

15. The apparatus as set forth in claim 1, further comprising a door driving means for moving the door, the door control means further comprising an announcing means for announcing that the door is prevented from opening when the door is closed, wherein the door control means controls the announcing means to announce that the door is prevented from opening when the door is closed while the door control means does not control the door driving means to prevent the door from opening.

16. The apparatus as set forth in claim 8, wherein the announcing means announces using at least light, a voice, or letters.

17. The apparatus as set forth in claim 10, wherein the announcing means announces using light, a voice, or letters.

18. The apparatus as set forth in claim 12, wherein the announcing means announces using light, a voice, or letters.

19. The apparatus as set forth in claim 14, wherein the announcing means announces using light, a voice, or letters.

20. The apparatus as set forth in claim 1, wherein the door comprises a display means for displaying information.

21. The apparatus as set forth in claim 1, wherein the door comprises an operation panel having an operation switch for operating the apparatus.

22. An audio playback apparatus adapted for mounting in a vehicle, the apparatus comprising:

a door having an open position and a closed position;

a door detecting means for detecting a condition of the door;

a driving detecting means for detecting a driving condition of the vehicle; and a door control means for controlling the door in response to the condition of the door when the driving detecting means detects that the vehicle is running, wherein the audio playback apparatus is adapted to receive a memory medium through the door when the door is open.

* * * * *